United States Patent [19]

Hsia et al.

[11] Patent Number: 5,471,264
[45] Date of Patent: Nov. 28, 1995

[54] READING DEVICE

[76] Inventors: Chih-Yu Hsia, 301 Warren Way; Chih-Hung Hsia, 210 W. Las Tunas Dr., both of Arcadia, Calif. 91006

[21] Appl. No.: 323,878

[22] Filed: Oct. 17, 1994

Related U.S. Application Data

[63] Continuation-in-part of Ser. No. 83,165, Jun. 29, 1993, abandoned.

[51] Int. Cl.⁶ .......................... G02B 7/198; G03B 21/28
[52] U.S. Cl. .............................. 353/98; 353/99; 359/857; 359/862; 359/872
[58] Field of Search ................................. 353/98, 99, 28, 353/71, 72; 359/850, 857, 862, 865, 871, 872

[56] References Cited

U.S. PATENT DOCUMENTS

| | | | |
|---|---|---|---|
| 3,276,731 | 10/1966 | Orchard | 359/862 |
| 3,926,509 | 12/1975 | Davies et al. | |
| 4,531,813 | 7/1985 | Van den Berg | 359/862 |
| 4,605,291 | 8/1986 | Jolly | 359/862 |
| 4,759,621 | 7/1988 | Hawkins | 359/862 |
| 4,930,884 | 6/1990 | Tichenor et al. | 359/857 |
| 5,087,116 | 2/1992 | Taylor, II | 359/851 |
| 5,173,781 | 12/1992 | Masreliez | |

*Primary Examiner*—William A. Cuchlinski, Jr.
*Assistant Examiner*—William C. Dowling
*Attorney, Agent, or Firm*—William W. Haefliger

[57] ABSTRACT

In apparatus to facilitate reading of a book or the like by a reader looking upward and rearwardly, the combination comprising support means; a carrier for the book or the like, the carrier supported by the support means so that the book or the like faces forwardly; a first mirror spaced generally forwardly of the carrier and having a reflecting surface facing toward the carrier; a second mirror spaced generally upwardly relative to the first mirror and having a reflecting surface facing forwardly and downwardly toward the eye of the reader; and the mirrors having relative positions characterized in that an optical path extends from a book or the like on the carrier to the first mirror reflecting surface, then to the second mirror reflecting surface, and then to the eye of the reader.

11 Claims, 9 Drawing Sheets

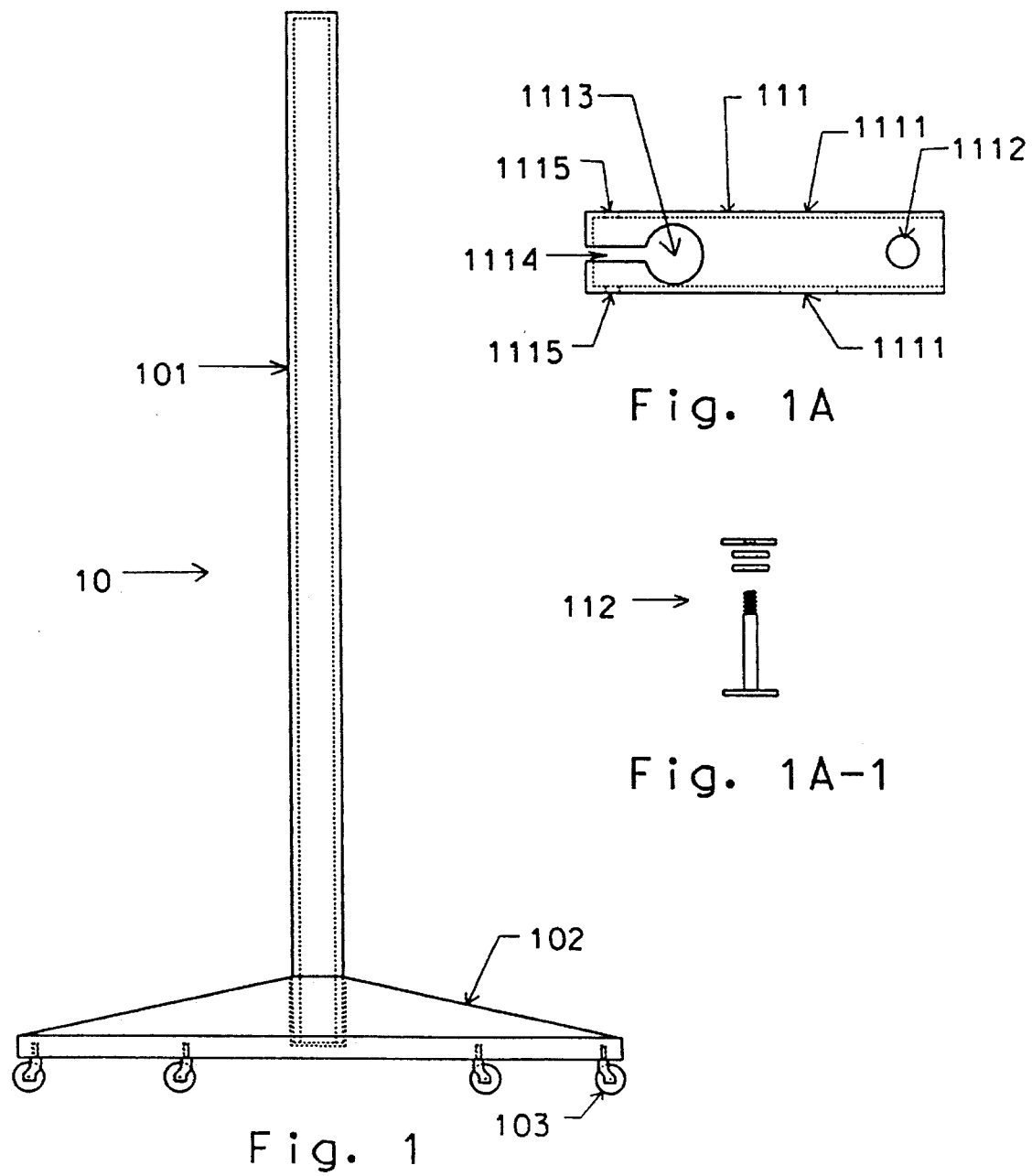

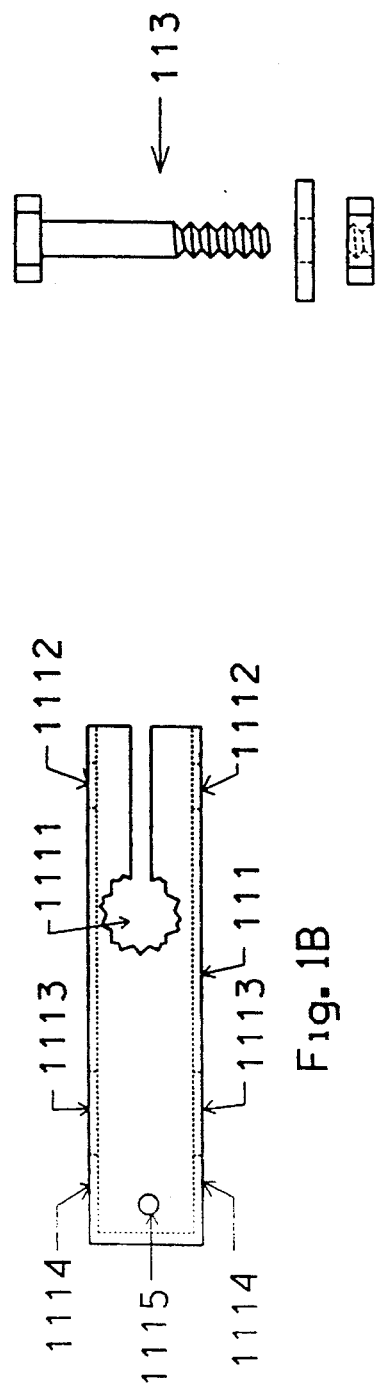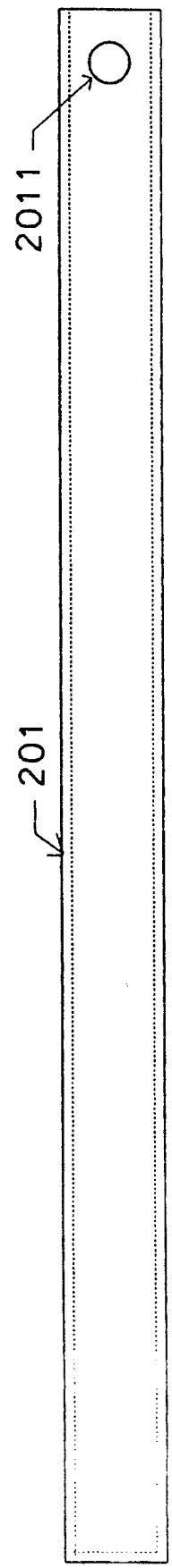

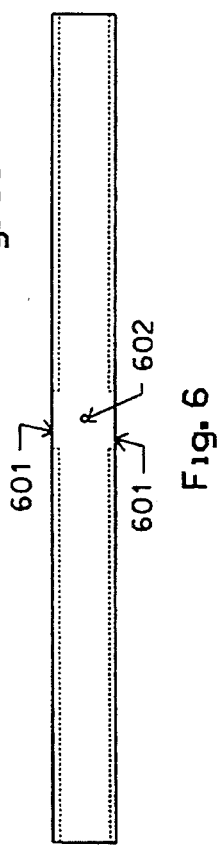
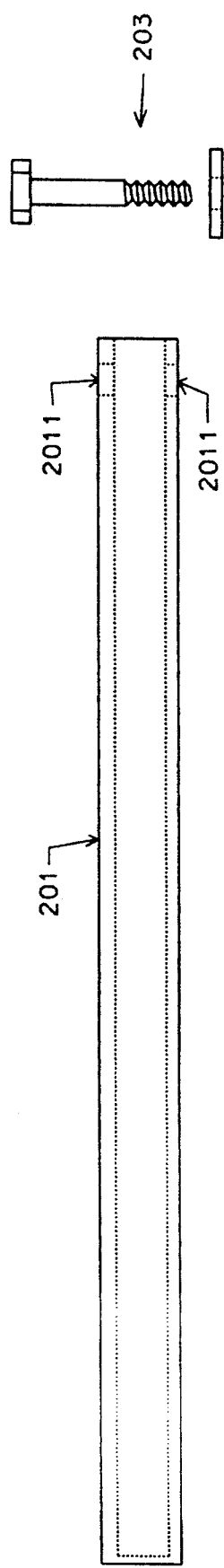
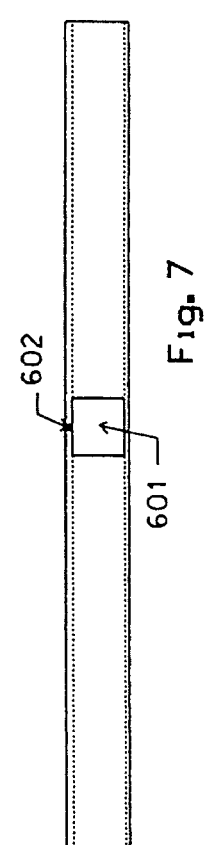
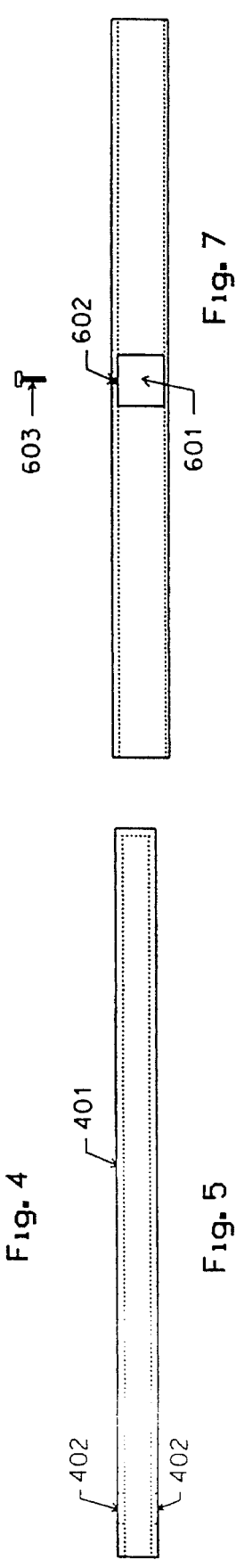
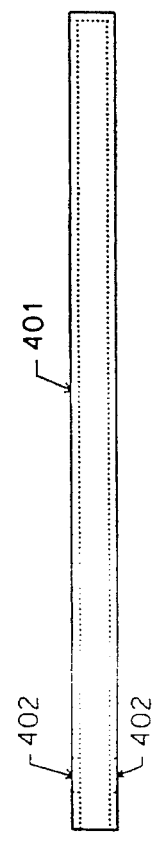
Fig. 3b
Fig. 3a
Fig. 6
Fig. 7
Fig. 4
Fig. 5

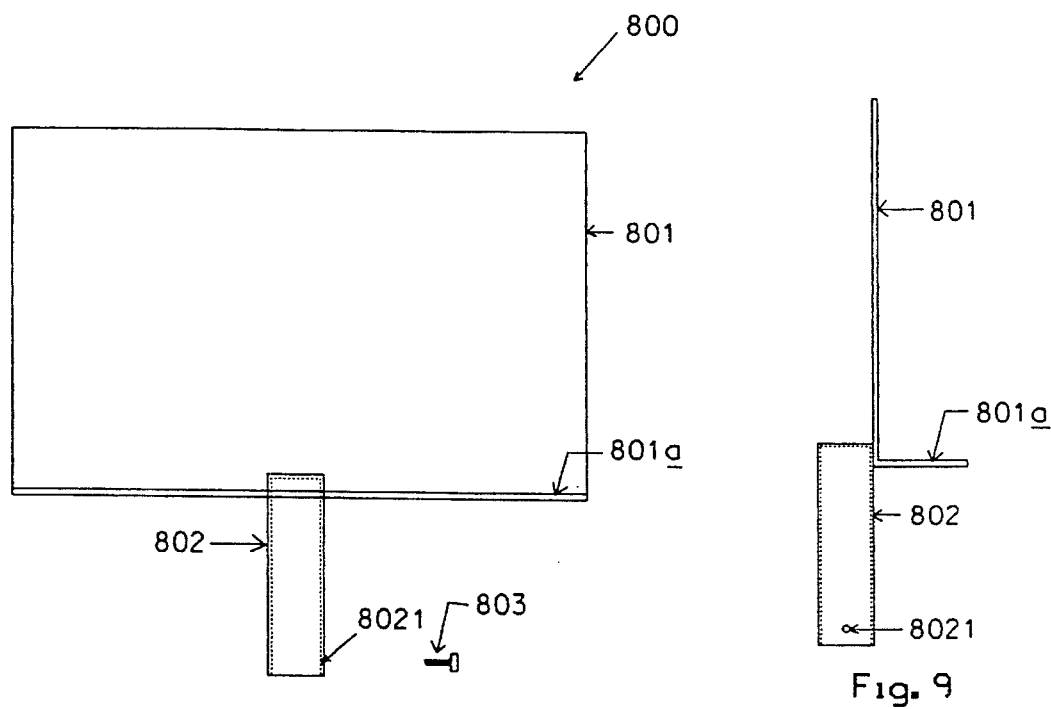
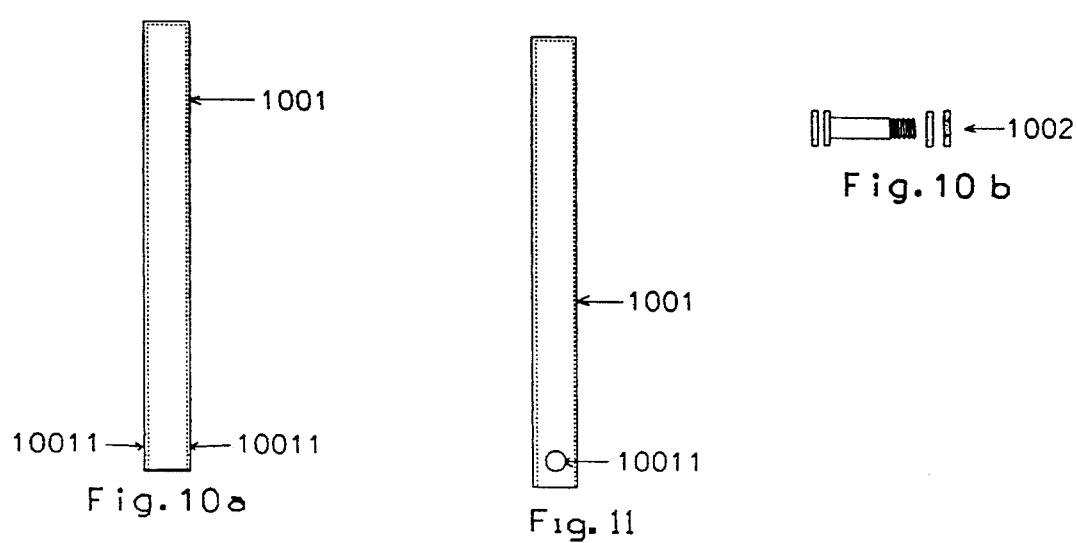

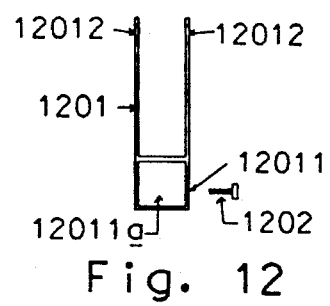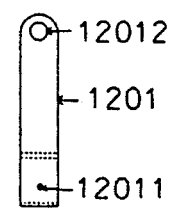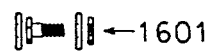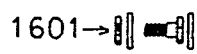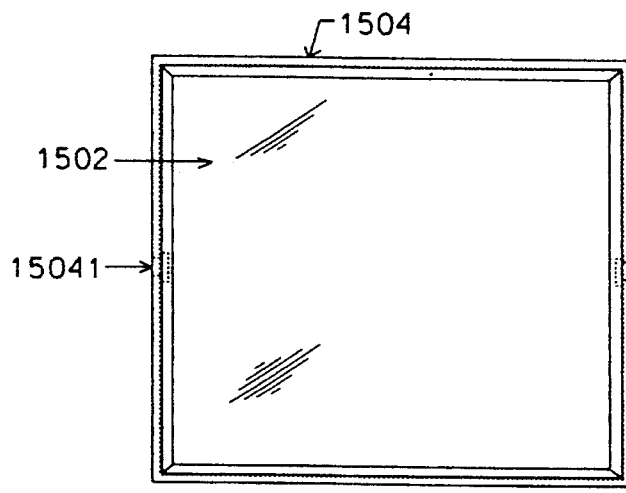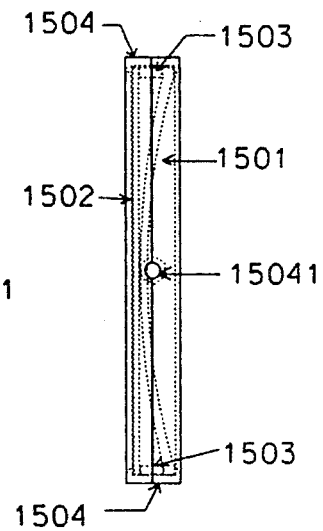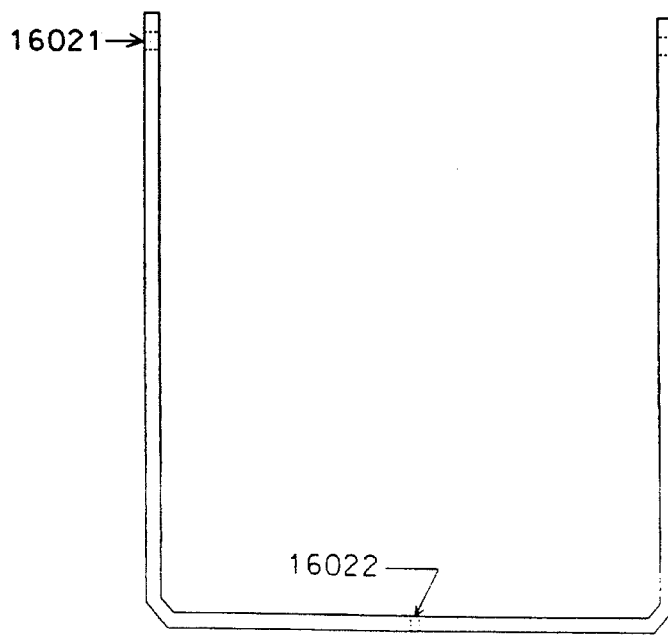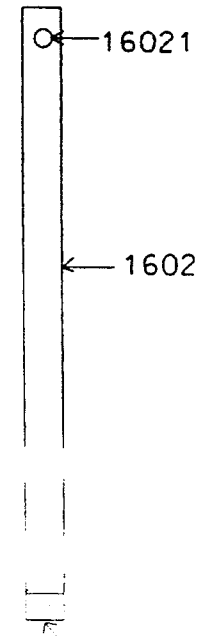

5,471,264

READING DEVICE

This application is a continuation-in-part of Ser. No. 08/083,165 filed Jun. 29, 1993 now abandoned.

BACKGROUND OF THE INVENTION

This invention relates to a device which helps the user to read a book while lying on a bed. The invention also relates to a device to assist the reader in reading a book on a desk or a table. The invention further relates to a device which helps a reader to read a book by enlarging book character images.

Reading a book while lying down on a bed sometimes is tiresome, because it requires that the arms and hands constantly hold up the book. Furthermore, it tires the reader's eyes if the sizes of the words or other characters in the book are too small. There is need for improved means or apparatus that alleviates these problems, in a simple effective, useful and improved manner.

SUMMARY OF THE INVENTION

Basically, the apparatus of the invention comprises
a) support means,
b) a carrier for said book or the like, the carrier supported by the support means so that the book or the like faces forwardly,
c) a first mirror spaced generally forwardly of the carrier and having a reflecting surface facing toward the carrier,
d) a second mirror spaced generally upwardly relative to the first mirror and having a reflecting surface facing forwardly and downwardly toward the eye of the reader,
e) said mirrors having relative positions characterized in that an optical path extends from a book or the like on the carrier to the first mirror reflecting surface, then to the second mirror reflecting surface, and then to the eye of the reader.

One form of the invented device can support the book and also enlarge the viewed words in the book, so that reading while lying on beds can be more enjoyable. A variation of the invented device can help a reader to read a book on a desk or a table, by enlarging the sizes of the works in the book, as viewed.

Another object is to allow the positions of the two mirrors to be arranged so that the works or characters can be read in a mirror which would be in a position where the book would be held if the apparatus were not used. A concave mirror or mirrors can be used to enlarge a book's words, as will be seen.

These and other objects and advantages of the invention, as well as the details of an illustrative embodiment, will be more fully understood from the following specification and drawings, in which:

DRAWING DESCRIPTION

FIG. 1 is an elevation view of a stand;

FIGS. 1A and 1B are a plan view and an elevation view, respectively, of a "STA" link. Components of an associated STL connector, and another associated STA connector are also shown respectively in FIGS. 1A and 1B;

FIGS. 2 and 3a are a plan view and an elevation view, respectively, of an outreaching arm. Components of an associated OTM connector are also shown in FIG. 3b;

FIGS. 4 and 5 are a plan view and an elevation view, respectively, of a mounting beam;

FIGS. 6 and 7 are a plan view and an elevation view, respectively, of a cross beam; FIG. 7 shows an associated screw;

FIGS. 8 and 9 are an elevation frontal view and a right end respectively, of an object stand assembly, an associated screw also shown in FIG. 8;

FIGS. 10a and 11 are a frontal elevation view and a right side view, respectively, of an object stand sliding arm set, the components of an OSC connector also shown in FIG. 10b;

FIGS. 12 and 13 are a front elevation view and a right side view, respectively, of an object stand mounting connector, an associated OSMC screw also shown in FIG. 12;

FIGS. 14 and 15 are a frontal elevation view and a right side view, respectively, of a mirror set;

FIGS. 16 and 17 are a frontal elevation view and a right side view, respectively, of a mirror mounting set, the components of two mirror mounting connectors and an MS connector also being shown in FIGS. 16B and 16C;

GENERAL DESCRIPTION

Figure 22:
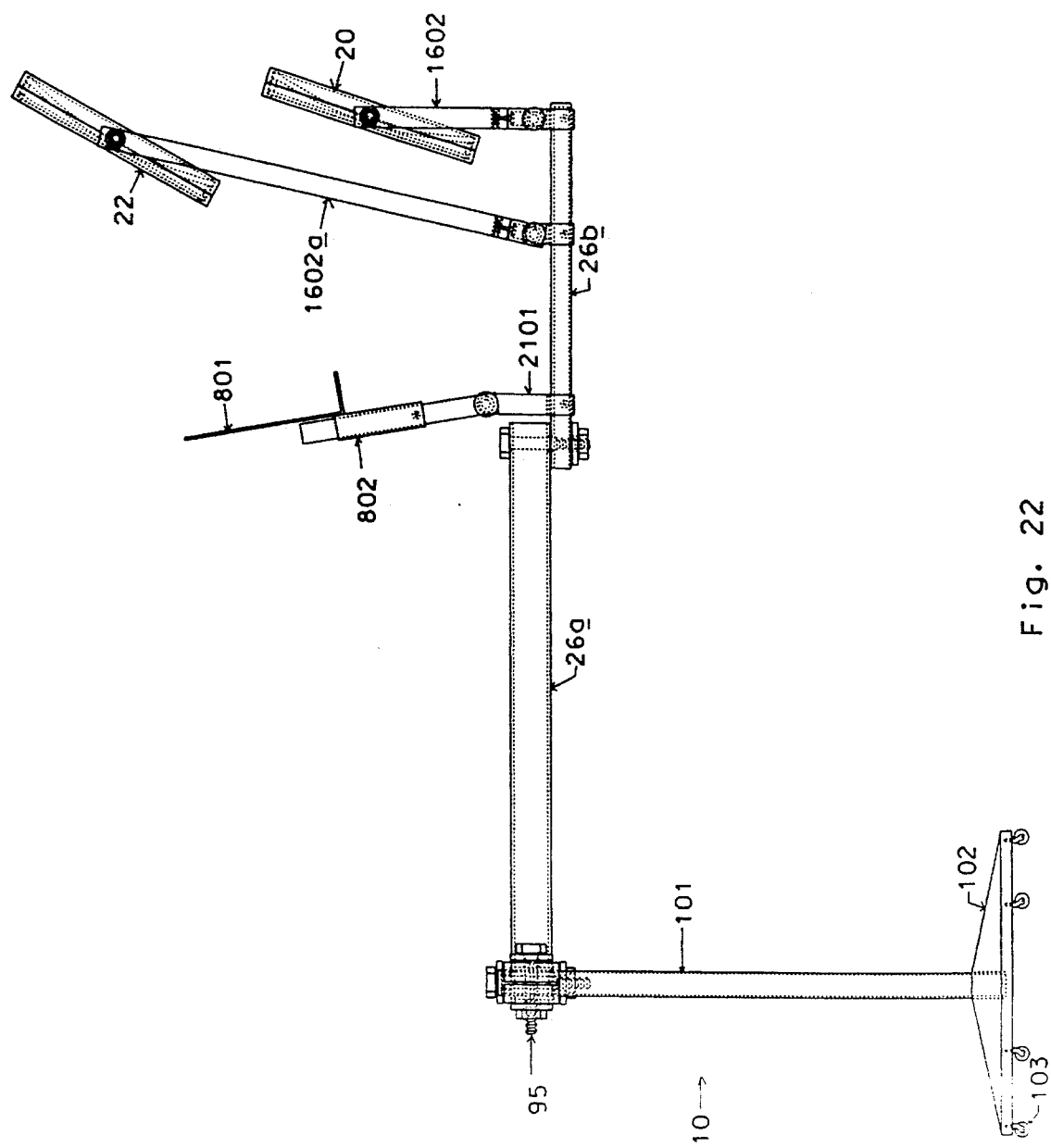
FIG. 22 is an elevation view of one of an assembled viewing device.

Referring first to FIGS. 1 and 22, a support means 10 includes an upright stand 101, and a base 102 supporting the stand. Roller means in the form of casters 103 support the base to allow adjustable horizontal positioning of the base and stand, as well as of posts and mirrors (to be described) as a unit. The casters may swivel about vertical axes, and may be spaced apart in two orthogonal horizontal directions whereby upsetting of the entire unit is prevented.

Figure 24:
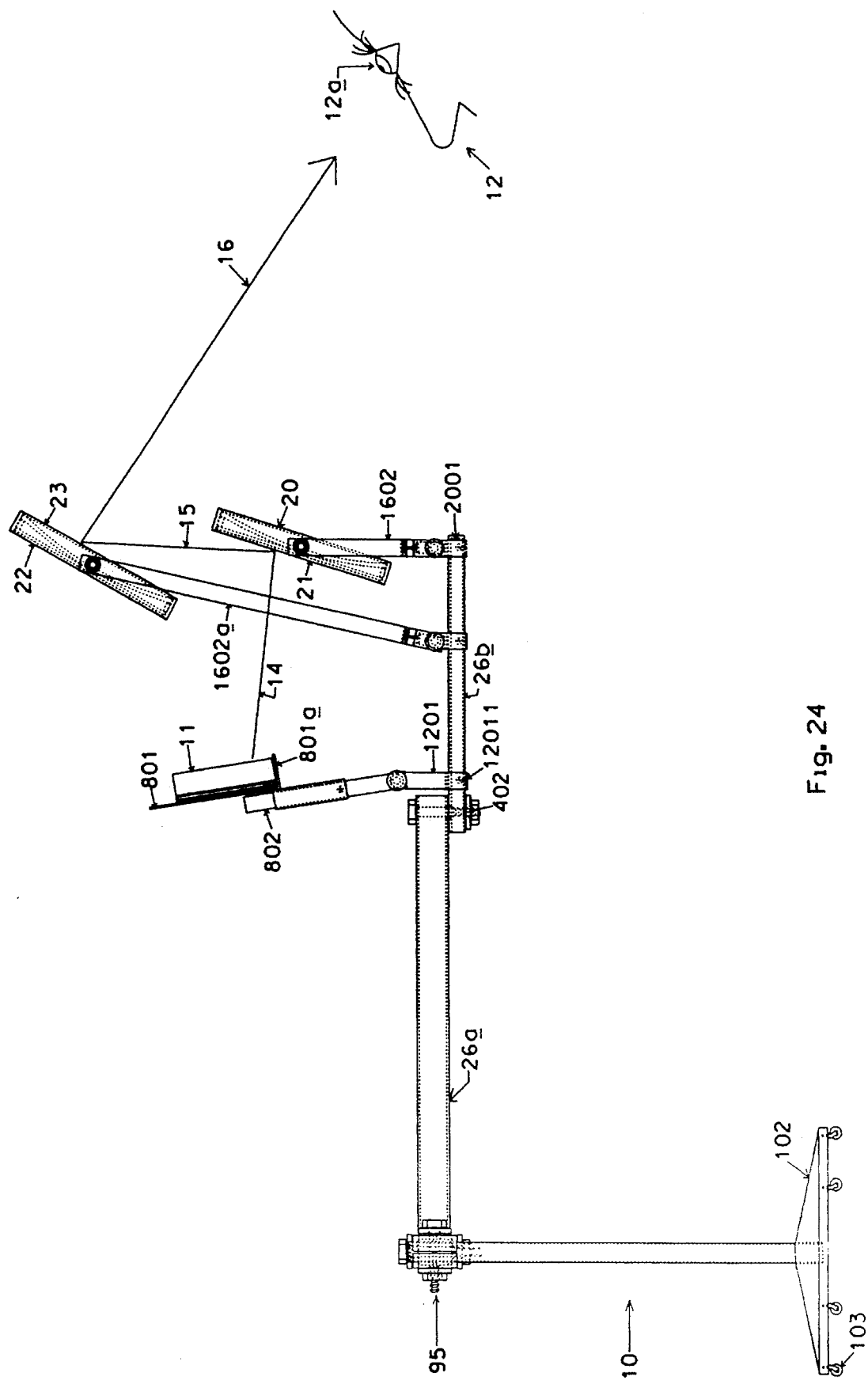
FIG. 24 illustrates the use of the assembled device.

The apparatus is constructed to facilitate reading or observation of a book 11 or the like by a reclining reader 12 looking upward and rearwardly, as along a line of sight 16 seen in FIG. 24. The reader's eye is indicated at 12a, and the image of the book written material travels forwardly along optical path 14, upwardly along optical path 15, and forwardly and downwardly along optical path 16 coinciding with the reader's line of sight referred to above.

A carrier is provided for said book or the like, the carrier supported by the support means so that the book or the like faces forwardly. As shown in FIGS. 8, 9 and 24, the carrier 800 includes an upright back panel 801 against which the book rests, and a forwardly extending ledge 801a at the base of panel 801, to support the book lower edge or edges. A single clamp or clamps may be used to retain the open book to the panel, or to the ledge.

A first mirror assembly 20, seen in FIGS. 14, 15, and 24 is spaced generally forwardly of the carrier 801 and has a reflecting surface 21 facing toward the carrier to receive light traveling along path 14, and to reflect that light upwardly along path 15. A second mirror assembly 22, seen in FIG. 24, and like assembly 20 is spaced generally upwardly or at a higher level relative to the first mirror assembly, and has a reflecting surface 23 facing forwardly and downwardly toward the eye of the reader, as shown. The two mirrors have relative positions characterized in that an optical path extends from a book or the like on the carrier to the first mirror reflecting surface, then to the second mirror reflecting surface, and then to the eye of the reader.

Also provided is a beam 26 carried by the stand to extend generally horizontally, and first and second upright arms or posts carried by the beam and respectively supporting the first and second mirrors. At least one of the posts has adjustable movable connection to the beam to allow forward and rearward shifting of said one post relative to the other post. Also at least one of the mirrors has adjustable relative tilting via two post sections about a horizontal axis. Further, at least one of the posts may have two sections interconnected by a pivot allowing adjustable relative tilting of said sections about a horizontal axis; and typically, both posts have two such sections. A third upright post is carried by the beam to support the book carrier; and the third post typically has two sections interconnected by a pivot allowing adjustable relative tilting of said sections about a horizontal axis. See for example post 1001 in FIGS. 10a and 11 for the book carrier.

The support 10, as referred to above, consists of a stand stem, or standard, a stand base, several optional stand casters, a STA link, a STL connector, and STA connector. The stand stem, the stand base, and the stand casters are shown as 101, 102, and 103, respectively, in FIG. 1. The STA link, the STL connector, and STA connector are shown as 111, 112, and 113, respectively, in FIGS. 1A, 1B, 1A-1 and 1B-1. The stand stem is a rod. The stand base is a base of any suitable shape. The stand casters are connected to the bottom side of the stand base. The stand stem or standard 101 is connected to the top side of the stand base. The STA link 111 is a rod with an S hole, an S slot, and an STL hole near the other end.

The S hole, the S slot, and the STL hole are shown as 1113, 1114, and 1115, respectively, in FIGS. 1A and 1B. The A hole, the A slot, and the SWTA hole are shown as 1111, 1112, and 1113, respectively, in FIGS. 1A and 1B. The S hole and the A hole are holes connected with the S slot and the A slot, respectively. The S slot is a slot which spans between the end of the STA link and the S hole. The A slot is a slot which spans between the end of the STA link and the A hole. The A hole and the A slot are on the same side of the STA link. The STA hole is on a different side of the A hole and the A slot. The S hole and the S slot are on the same side of the STA link. The STL hole is on a different side of the S hole and the S slot. The A hole and the S hole are on a different side of the STA link.

The STL connector as seen at 102 is a set of bolt, nut, and washers. The stand stem penetrates the S hole. The threads and the shank of the bolt of the STL connector penetrates the STL hole. The bolt, the nut and the washers of STL connector can be tightened to reduce the width of the S slot to hold the STA link onto the stand stem.

The outreaching arm or main beam carried by the stand consists of an arm, and a OTM connector, shown as 201 and 203, respectively, in FIGS. 2, 3, and 3b. Beam 201 corresponds to element 26a in FIG. 24. The arm is a rod which has an OTM hole, shown as 2011 in FIGS. 2 and 3, that hole located near one end of the arm. The OTM connector is a set 203 of bolt, nut and washers. The outreaching arm penetrates the A hole. The threads and the shank of the bolt of the STA connector penetrates the STA hole. The bolt, the nut and the washers of the STA connector can be tightened to reduce the width of the A slot to hold the arm onto the STA link.

The term "beam" as used herein may include main beam 201 and a mounting beam, shown as 401 in FIGS. 4 and 5. Beam 401 is a rod with an MTO hole, shown as 402 in FIGS. 4 and 5, near one of its ends. The threads and the shank of the bolt of the OTM connector penetrate the OTM hole and the MTO hole. The bolt, the nut, and the washers of the OTM connector fasten the outreaching arm and the mounting beam together, to form the overall "beam". Beam or rod 401 corresponds to element 26b in FIG. 24.

The object stand assembly or carrier (for a book) consists of an object stand set (FIGS. 8 and 9), an object stand sliding arm set (FIGS. 10 and 11), and an object stand mounting set (FIGS. 12 and 13). The object stand set 800 consists of an object stand 801, and object stand sliding guide 802 and an optional OSS screw 803, in FIGS. 8 and 9. The object stand is a plate or panel 18 with a L-shaped cross-section. The object stand sliding guide is a sleeve with an optional OSS hole, shown as 8021 in FIGS. 8 and 9, near one of it's ends. The OSS hole is a hole with female threads. The object stand sliding guide is connected by riveting, bolting, gluing, and/or welding, to the back side of the longer leg of the L-shaped object stand. The OSS screw is a screw with threads that engage with the female threads of the OSS hole.

The object stand sliding arm set consists of an object stand sliding arm or post and a OSC connector, shown as 1001 and 1002, respectively, in FIGS. 10a and 11. The object stand sliding arm is a rod with a OSC hole, shown as 10011 in FIGS. 10a and 11, near one of its ends. The object stand sliding arm penetrates the hollow of the object stand sliding guide. The point of the OSS screw 803 can reach the object stand sliding arm while it engages with the OSS hole. The OSC connector 1002 is a set of bolt, nut, and washers.

The object stand mounting set consists of an object stand mounting connector and an optional OSMC screw, shown as 1201 and 1202 in FIGS. 12 and 13, respectively. The object stand mounting connector is a hollow sleeve with an optional OSMC hole, shown as 12011 in FIGS. 12 and 13, and two extruding ears on the sides. The mounting beam is received through the hollow 12011a of the object stand mounting connector, allowing sliding of the connector 1201 and the book 11 toward or away from the mirrors. The OSMC hole has female threads. The upper end of each of the extruding ears of the object stand mounting connector has an OSM hole 12012. The threads and the shank of the OSC connector penetrate the OSC hole and the OSM holes. The nut, the washers, and the bolt of the OSC connector fasten the object stand mounting set and the object stand sliding arm set together. The OSMC screw has threads that can engage with the female threads of the OSMC hole. The point of the OSMC screw can reach the mounting beam while engaging with the OSMC hole. The elements 1001 and 1201 define sections of the carrier mounting post.

Figure 19:
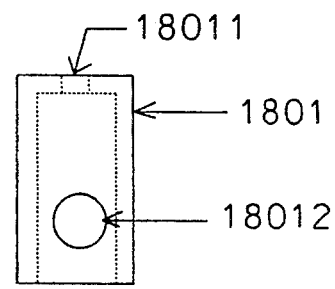
Figure 20:
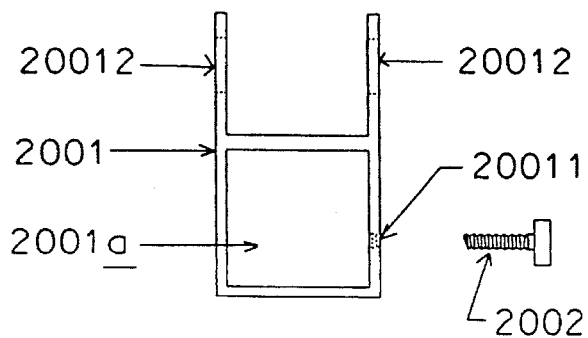
FIGS. 20 and 21 are a frontal elevation view and right side view, respectively, of a mirror connector set. An MM screw also being shown in FIG. 20.
Figure 21:
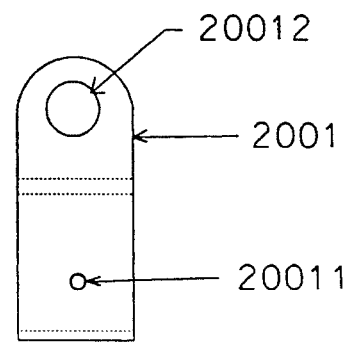

The mirror assembly consists of a mirror set (FIGS. 14 and 15), a mirror mounting set (FIGS. 16a and 17), a mirror link set (FIGS. 18a and 19), and a mirror connector set (FIGS. 20 and 21).

The mirror set (see 20 in FIG. 24) consists of a concave mirror, a flat mirror, one or more mirror spacers, and a mirror frame, shown as 1501, 1502, 1503, and 1504, respectively, in FIGS. 14 and 15. See also set 22 in FIG. 24. The mirror spacer is made of material suitable to separate and support both the concave mirror and flat mirror on their backs. The mirror frame encompasses the concave mirror and the flat mirror. The mirror frame consists of two parts. Each part of the mirror frame has a J-shaped cross-section. The front side of each mirror is confined by the hook of the "J". The back side of each mirror is supported by the mirror spacer. The two parts of the mirror frame are glued together at the heads of the J's. The mirror frame has two MM holes, shown as 1041 in FIGS. 14 and 15. The MM hole is a hole.

The mirror mounting set (associated with each mirror set 20 or 22) consists of two mirror mounting connectors, a mirror mounting frame, and an MS connector, shown as 1601, 1602, and 1603, respectively, in FIGS. 16a and 17. Each mirror mounting connector is a set of bolt, nut, and washers. The mirror mounting frame is a U-shaped frame with a MF hole, shown as 16021 in FIGS. 16a and 17, near each end of its two legs and a MFS hole, shown as 16022 in FIGS. 16a and 17, near the middle of the flat portion of the U-shaped frame. The two legs or posts of the mirror mounting frame of one of the mirror assemblies are longer than those of the other mirror assembly. Compare 1602 vs. 1602a in FIG. 24. The MF holes and the MFS hole are holes. The MS connector is a set of bolt, nut, and washers. The heads of the bolts of the mirror mounting connectors are enclosed inside the mirror frame. The threads and the shanks of the bolts of the mirror mounting connectors penetrate the MM holes and the MF holes. The bolts, the nuts, and the washers of the mirror mounting connectors connect the mirror set and the mirror mounting frame together.

Figure 18A:
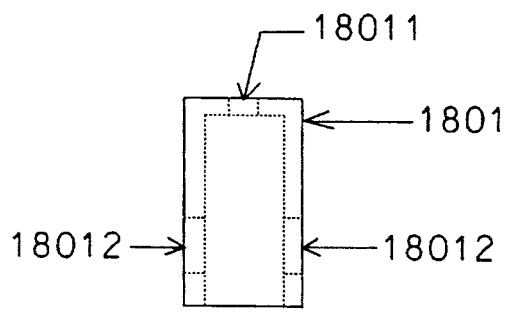
FIGS. 18a and 19 are a frontal elevation view and a right side view, respectively, of a mirror link set, components of an MF connector also being shown in FIG. 18b.
Figure 18B:
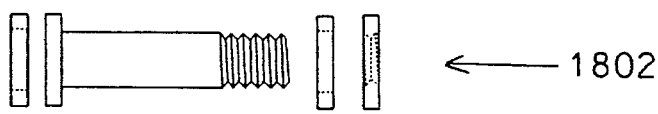

The mirror link set consists of a mirror frame link and an MF connector, shown as 1801 and 1802, respectively, in FIGS. 18a, 18B and 19. The mirror frame link is a short hollow sleeve with a closed end having an MS hole, shown as 18011 in FIGS. 18a and 19. Near the other end of the mirror frame link is an ML hole, shown as 18012 in FIGS. 18a and 19. The MF connector seen in FIG. 18b is a set of bolt, nut and washers. The threads and the shank of the bolt of the MS connector penetrates the MFS hole and the MS hole. The head, the nut, and the washers of the MS connector fasten the mirror mounting set and the mirror link set together.

The mirror connector set consists of a mirror mounting connector and an optional MM screw, shown as 2001 and 2002, respectively, in FIGS. 20 and 21. The mirror mounting connector is a hollow sleeve with an optional M hole, shown as 20011 in FIGS. 20 and 21, and two protruding ears on the sides. The mounting beam 26b penetrates the hollow 2001a of the mirror mounting connector. The M hole is a hole with female threads. The far end of each ear of the mirror mounting connector has an MC hole, shown as 20012 in FIGS. 20 and 21. The threads and the shank of the MF connector of FIG. 18b penetrate the ML hole and the MC holes. The nut, the washers and the bolt of the MF connector connect the mirror link set and the mirror connector set together. The MM screw has threads that engage the female threads of the M hole. The point of the MM screw can reach the mounting beam while engaging with the M hole.

Figure 23:
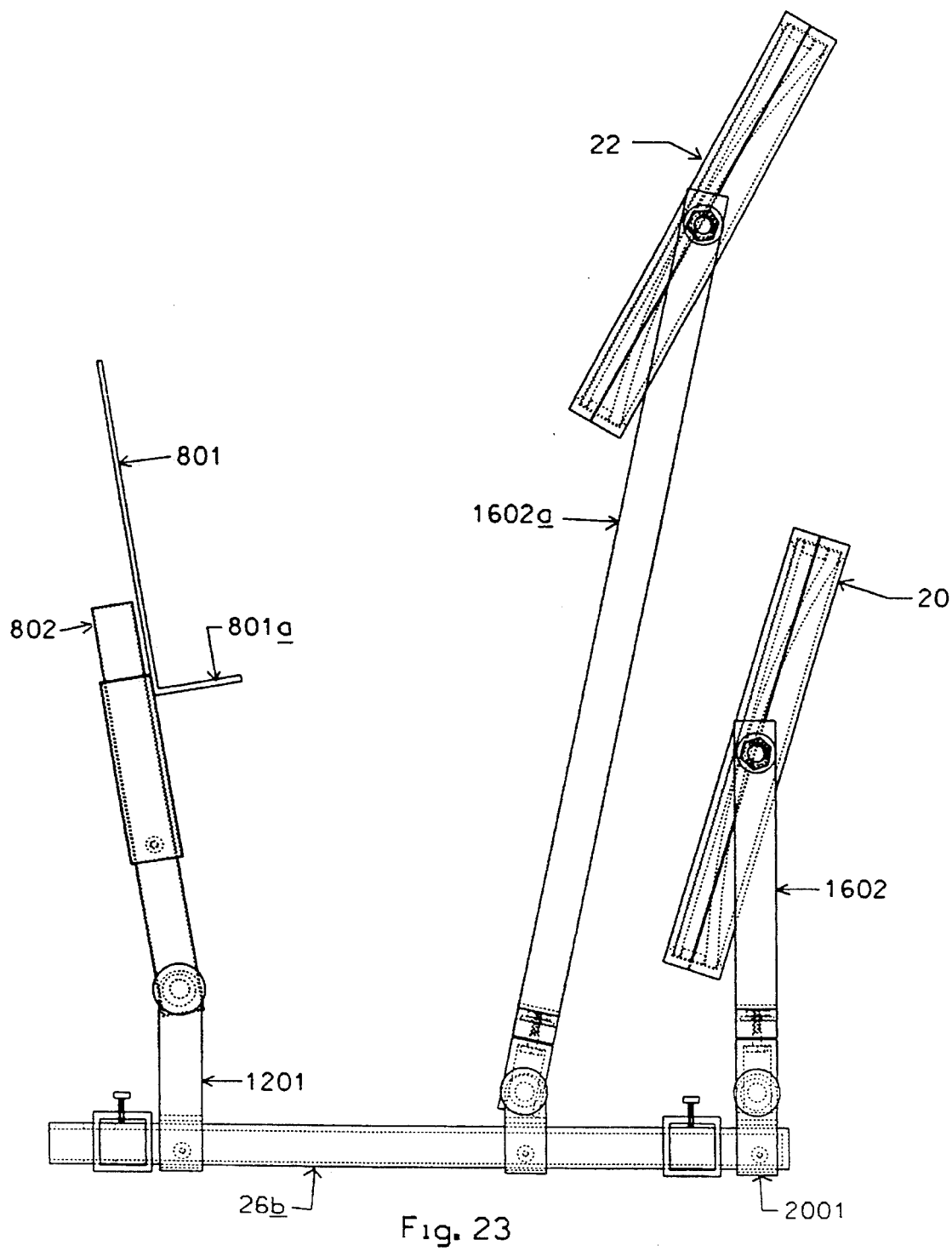
FIG. 23 is an enlarged elevation view of a modified viewing device.

A modified form of the device seen in FIG. 23 consists of a mounting beam (FIGS. 4 and 5), two cross beams (FIGS. 6 and 7), an object stand assembly (FIGS. 8–13), and two mirror assemblies (FIGS. 14–20). The majority of the components of the modified device are the same as those described in the previous paragraphs. The major difference is that the modified device has one or two cross beams (FIGS. 6 and 7) and 26b in FIG. 23 which replace the stand and the outreaching arm for the previous described device.

The cross beam for the FIG. 23 device is a rod with a beam hollow, an optional B hole, and an optional B screw, shown as 601, 602, and 603, respectively, in FIGS. 6 and 7. The beam hollow is a hole near the middle portion of the cross beam. The mounting beam penetrates the beam hollow. The cross beam acts as a supporting base. The B hole is a hole on the wall of the beam hollow. The B hole has female threads. The B screw is a screw which threads can engage with these of the B hole.

For both of the described devices, the object stand assembly is installed near one end of the mounting beam 26b while the two mirror assemblies are installed near the other end. For the purposes of illustrations, the mirror assembly closest to the object stand assembly may be called the middle mirror assembly. The mirror assembly furthest away from the object stand assembly may be called the far mirror assembly. For both of the mirror assemblies, the mirrors facing toward the object stand are called the front mirrors. The mirrors facing away from the object stand are called the back mirrors.

To use the invented device, an object, such as a book, is placed on the object stand. The user then arranges the positions of the object stand assembly and the mirror assemblies. The image of the object will be firstly reflected by the front mirror of the far mirror assembly. This image is a reversed image. The user can not read directly from this image. This reversed image then will be reflected by the back mirror to the middle mirror assembly. On this mirror, the user can read the object. The concave mirror will enlarge the reflected images. The object will be enlarged and easy to read. Adjustment of the concave mirror and/or the flat mirror can be done easily by revolving the mirror set on the mirror mounting connectors, i.e. about horizontal swing axes defined by the connectors.

The device which includes the stand and the outreaching arm allows reading while the reader lies on a bed. The stand can be used to support the other parts of the device. The outreaching arm or beam 26 helps to put the object, the mounting beam and other mounted assemblies to a comfort position, for example, above the user's belly and chest. Beam 26a swivels at 95 on 10.

The user can use the device with the cross beams 26a and 26b on a solid surface, such as on a desk. The cross beams can be of sufficient weight and size to balance and support the object, the mounting beam and its associated assemblies.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

We claim:

1. In apparatus to facilitate reading of a book by a reader looking upward and rearwardly, the combination comprising
   a) support means,
   b) a carrier for said book, the carrier supported by the support means so that the book faces forwardly,
   c) a first mirror spaced generally forwardly of the carrier and having a reflecting surface facing toward the carrier,
   d) a second mirror spaced generally upwardly relative to the first mirror and having a reflecting surface facing forwardly and downwardly toward the eye of the reader,
   e) said mirrors having relative positions characterized in that an optical path extends from a book on the carrier to the first mirror reflecting surface, then to the second mirror reflecting surface, and then to the eye of the reader, f) said support means including:
  i) an upright stand,
  ii) a beam carried by the stand to extend generally horizontally,
  iii) and first and second upright posts carried by the beam and respectively supporting the first and second mirrors, g) and wherein at least one of said posts has adjustable movable connection to the beam to allow forward and rearward shifting of said one post relative to the other post.

2. The combination of claim 1 wherein at least one of said mirrors has adjustable tilt connection to the post supporting said one mirror to allow adjustable tilting of said one mirror about a horizontal axis.

3. The combination of claim 1 including a base supporting said stand, and roller means supporting said base to allow adjustably horizontal positioning of the stand, posts and mirrors as a unit.

4. The combination of claim 1 wherein at least one of said posts has two sections interconnected by a pivot allowing adjustable relative tilting of said sections about a horizontal axis.

5. The combination of claim 4 wherein each of said first and second posts has two sections interconnected by a pivot allowing adjustable relative tilting of said sections about a horizontal axis.

6. The combination of claim 1 wherein one of said first and second mirrors includes a flat mirror and a concave mirror.

7. In apparatus to facilitate reading of a book by a reader looking upward and rearwardly, the combination comprising
  a) support means,
  b) a carrier for said book, the carrier supported by the support means so that the book faces forwardly,
  c) a first mirror spaced generally forwardly of the carrier and having a reflecting surface facing toward the carrier,
  d) a second mirror spaced generally upwardly relative to the first mirror and having a reflecting surface facing forwardly and downwardly toward the eye of the reader,
  e) said mirrors having relative positions characterized in that an optical path extends from a book on the carrier to the first mirror reflecting surface, then to the second mirror reflecting surface, and then to the eye of the reader,
  f) said support means including:
    i) an upright stand,
    ii) a beam carried by the stand to extend generally horizontally,
    iii) and first and second upright posts carried by the beam and respectively supporting the first and second mirrors,
  g) and including a third upright post carried by the beam and supporting said carrier.

8. The combination of claim 7 wherein at least one of said posts has adjustable movable connection to the beam to allow forward and rearward shifting of said one post relative to the other post.

9. The combination of claim 7 wherein said third post has two sections interconnected by a pivot allowing adjustable relative tilting of said sections about a horizontal axis.

10. The combination of claim 7 wherein each of said first, second and third posts has two sections interconnected by a pivot allowing adjustable relative tilting of said sections about a horizontal axis.

11. In apparatus to facilitate reading of a book by a reader looking upward and rearwardly, the combination comprising
  a) support means,
  b) a carrier for said book, the carrier supported by the support means so that the book faces forwardly,
  c) a first mirror spaced generally forwardly of the carrier and having a reflecting surface facing toward the carrier,
  d) a second mirror spaced generally upwardly relative to the first mirror and having a reflecting surface facing forwardly and downwardly toward the eye of the reader,
  e) said mirrors having relative positions characterized in that an optical path extends from a book on the carrier to the first mirror reflecting surface, then to the second mirror reflecting surface, and then to the eye of the reader,
  f) said support means including:
    i) an upright stand,
    ii) a beam carried by the stand to extend generally horizontally,
    iii) and first and second upright posts carried by the beam and respectively supporting the first and second mirrors,
  g) and wherein the beam includes first and second sections, the second section slidably carried by the first section to slide lengthwise relative thereto, the first section carried by the stand, the first and second upright posts carried by the second section.

* * * * *